Aug. 3, 1965  H. ORNER  3,198,029
PRELOADED BALL BEARING SCREW AND NUT MECHANISM
Original Filed July 30, 1953  2 Sheets-Sheet 1

INVENTOR:
Harry Orner

Aug. 3, 1965          H. ORNER          3,198,029
PRELOADED BALL BEARING SCREW AND NUT MECHANISM
Original Filed July 30, 1953          2 Sheets-Sheet 2
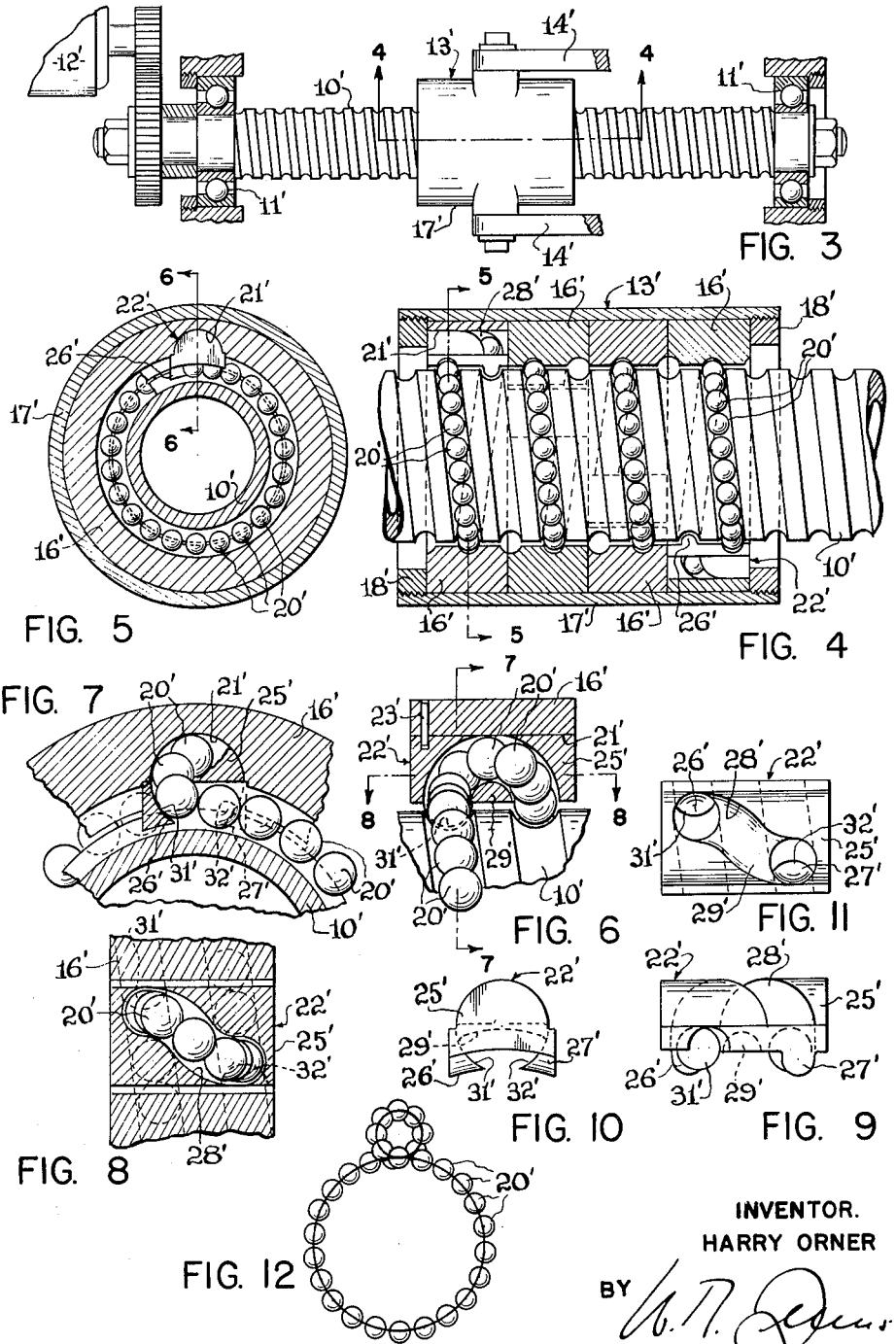
INVENTOR.
HARRY ORNER
BY
ATTORNEY.

United States Patent Office 3,198,029
Patented Aug. 3, 1965

3,198,029
PRELOADED BALL BEARING SCREW AND
NUT MECHANISM
Harry Orner, 2479 Glen Canyon Road, Altadena, Calif.
Original applications July 30, 1953, Ser. No. 371,253,
and Apr. 2, 1959, Ser. No. 803,804. Divided and this
application Feb. 24, 1961, Ser. No. 91,545
5 Claims. (Cl. 74—459)

This invention relates to recirculating ball bearing screw and nut mechanisms for changing rotary to linear, or linear to rotary, motion by means of rolling balls. The invention also relates to methods of eliminating end play or backlash, and effecting load dividing, in such mechanisms.

This application is a division of my copending applications Ser. No. 371,253, filed July 30, 1953, for Ball Bearing Screw and Nut Mechanism, now abandoned, and Ser. No. 803,804, filed Apr. 2, 1959, for Preloaded Ball Bearing Screw and Nut Mechanism, now forfeited, and a continuation-in-part of Ser. No. 459,605, filed Oct. 1, 1954, for Ball-Bearing Screw and Nut Mechanism, now Patent No. 2,895,343.

The ball bearing screw and nut mechanisms as known heretofore consist of a screw and nut with balls distributed on the spiral race of the nut to carry a load by the rolling action of the balls. A return tube connecting the ends of the race in the nut serves to recirculate the ball back to the beginning of the race. This return tube complicates the mechanism and limits the functional and economical use of the device and this is particularly true where the return tube extends outside the confines of the nut body where it is subject to injury and failure by reason of interference or obstruction to the free circulation of the balls.

An important feature of the invention is the provision made for assembling the principal components with precision and in such manner that all balls and the surfaces of the races in contact therewith are loaded uniformly and to values known to a high degree of accuracy. These characteristics and features have long been sought but never before achieved except in a haphazard manner by laborious cut and try assembly procedures.

One of the primary objects of this invention is to provide an improved ball bearing screw and nut mechanism eliminating the return tube construction.

Another object of this invention is to provide a ball bearing screw and nut mechanism employing single turn recirculating paths for higher loading and better efficiency.

Another object of this invention is to provide a ball bearing screw and nut mechanism that automatically spaces the balls on the spiral race of the nut to eliminate the rubbing friction between the balls.

Another object of this invention is to provide a ball bearing screw and nut mechanism of economical construction.

Another object of this invention is to provide a ball bearing screw and nut mechanism incorporating separate and individual circulating systems assembled into a single articulate nut structure.

Another object of this invention is to provide a ball bearing screw and nut mechanism incorporating individual circulating systems assembled into a nut in such a way as to control the distribution of the loads on the balls, and to provide a method of effecting such assembly.

Another object of the invention is to provide a highly simple and economical nut means incorporating devices for causing the ball race to take the form of a figure eight.

Another object of the invention is the provision of a ball bearing nut and screw mechanism having a plurality of nut rings each having an independent closed circuit of recirculating balls which circuits are of figure eight configuration and include a relatively large diameter loop of at least one full convolution of balls all in contact with the screw groove, and characterized in the provision of means for preloading all balls in contact with the screw to a predetermined value whereby such balls remain loaded independently of the presence of external loads acting on the mechanism.

Another object of the invention is the provision of a ball bearing nut and screw mechanism having a plurality of similar nuts each held assembled to the screw by an independent closed circuit of balls and wherein said nuts are arranged to be rigidly locked against a predetermined position wherein it is known that the balls of each associated nut lying in juxtaposition to the screw will be loaded uniformly as an external load is applied to the mechanism.

Other objects and advantages will become more fully apparent as reference is had to the accompanying drawings wherein my invention is illustrated and in which:

FIGURE 3 is a plan view, partly in section showing another preferred embodiment of a ball bearing nut and screw mechanism incorporating the present invention in a typical operating environment;

FIGURE 4 is a view partly in longitudinal central section taken on line 4—4 of FIGURE 3;

FIGURE 5 is a transverse sectional view taken on the broken line 5—5 of FIGURE 4 and as viewed in the direction of the arrows;

FIGURE 6 is an enlarged fragmentary view taken on line 6—6 on FIGURE 5;

FIGURE 7 is a fragmentary sectional view taken on line 7—7 of FIGURE 6;

FIGURE 8 is a fragmentary sectional view taken on line 8—8 of FIGURE 6;

FIGURE 9 is a detail side elevational view showing the ball return insert removed from the nut ring;

FIGURES 10 and 11 are end and side elevational views respectively of the ball return means; and FIGURE 12 is a schematic view looking axially of the nut ring but showing the balls only and in their normal operating figure eight configuration.

Figure 1:
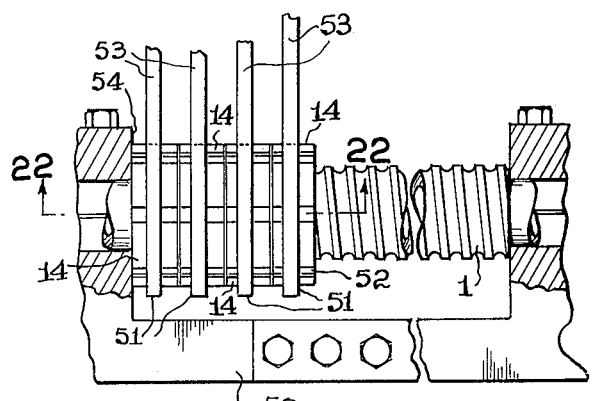
FIGURE 1 is a plan view partially in section illustrating a preferred embodiment of the invention during assembly.
Figure 2:
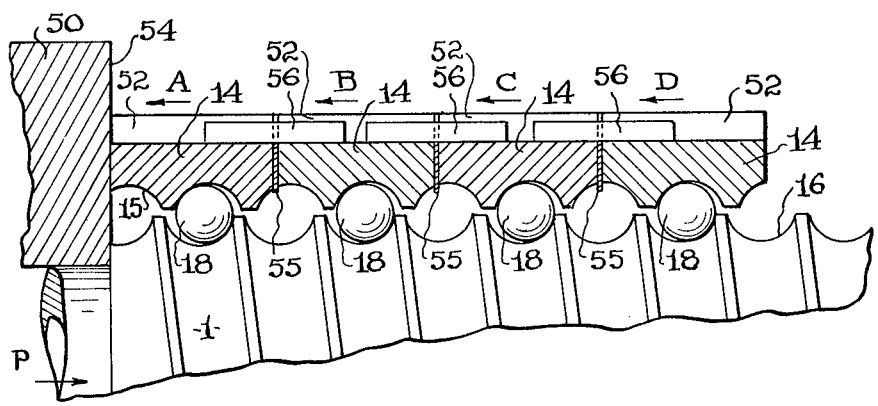
FIGURE 2 is an enlarged fragmentary sectional view taken on plane 2—2 of FIGURE 1.

Referring more particularly to FIGURES 1 and 2 showing one preferred embodiment of the invention and the process of assembly, the ball bearing nut and screw mechanism there shown by way of example includes a screw 1 having its opposite ends mounted in an assembly jig comprising a pair of L-shaped members 50 having their longer legs extending parallel and closely beside one lateral edge of screw 1. These legs are rigidly connected together by bolts. Rotatably mounted along the accurately formed helical groove 16 of screw 1 are a plurality of identical nut rings 14 each having in excess of one complete convolution of an inwardly facing helical groove 15 of the same pitch as groove 16. The nut rings are held assembled to screw 1 by an endless circuit of identical balls 18 having a load bearing convolution and a ball return loop portion located within the body of the associated nut ring 14 with the opposite ends of the return loop in communication with the opposite ends of the load grove convolution. The nut rings and the ball return loops as well as numerous other constructional details of both the rings and the associated screw 1 may take various forms, such as those illustrated in FIGURES 4 through 12 hereof or in FIGURES 1 to 20 of my copending application for Letters Patent Serial No. 773,668 filed Nov. 13, 1958, now Patent 2,924,113 granted Feb.

9, 1960. Since all features of these nut rings, balls and the associated screw are fully illustrated and described either hereinbelow or in my aforementioned patent, further description will be unnecessary.

In assembling the components shown in FIGURES 1 and 2, nut sections A, B, C and D are run onto screw 1 and are free to rotate relative to one another on balls 18 comprising each continuous ball circuits of the individual nut sections.

The opposite ends of screw 1 are then supported in bearings of a suitable rigid framework 50. These supporting bearings for the screw may comprise the machine in which the mechanism is to be used or an assembly fixture or tool. As will be appreciated, it is immaterial whether the bearing supports comprise part of the machine in which the screw is to be used or part of an assembly jig having its two halves 50 connected by cap screws in the manner shown in FIGURE 21.

To adjust and lock the nut sections accurately assembled, the assemblyman first applies a spanner wrench 53 (identical with spanner wrench 47 of FIGURES 18 and 19 of my earlier patent) to the left-hand nut section A, FIGURE 21 and rotates it forcibly against end surface 54 of the supporting bearing for screw 1. Since screw 1 is then held stationary it will be recognized that continued rotation of the nut to the left applies loading to those balls 18 of the ball circuit then in contact with screw groove 16. A predetermined load force W is applied to the outer end of the spanner wrench and maintained as the next nut ring B is similarly rotated against the adjacent face of nut ring A with an identical spanner wrench under the same applied loading W. If the locking key receiving keyways 52 are in alignment a locking key 56 is pressed into place locking nut sections A and B against relative rotation. It sometimes happens that keyways 52 are not then in alignment. In these circumstances, the nut undergoing adjustment can be counter-rotated to permit insertion of a shim 55 of the requisite thickness to align the keyways 52 as the same are rotated into abutment under the desired applied load W.

The assemblyman continues to adjust each of the remaining nut sections C and B in order following the same procedure described in connection with sections A and B until all have been locked in assembled position while the first nut section remains rotated against the screw supporting bearing. Once all nut sections have been properly and accurately adjusted and locked together, the wrenches are removed and the unitary nut assembly of rigidly interlocked components is free to rotate along the screw. So long as there is no applied external load, it will be recognized that the rigidly assembled nut unit will have limited axial movement with respect to the screw. However instantly, that an external load is applied, the nut assembly will move as a unit to place all balls in contact with the screw instantly under uniformly distributed load acting along diagonal lines arranged at substantially the same angle with respect to the screw axis. As the nut assembly and screw rotate relative to one another, the balls in the independent ball circuits of each nut section rotate as they circulate along the load groove and through the ball return loops of each circuit.

Thus, it has been shown that the nut rings 14, and likewise nut rings 25 and 32, can be manipulated on the screw 1 to load the balls 18 uniformly to carry an applied load.

However, owing to the initial precision assembly of the nut rings relative to one another and to the screw with each load ball of each nut being placed under uniform preloads of a known value, the application of an external load results in each ball assuming its own uniform share of the load instantly. The described capability and characteristics of the embodiment shown in FIGURES 1 and 2 are of very considerable importance because they provide the advantages of constantly preloaded nut assemblies described in my aforementioned patent without need for maintaining the balls preloaded when not subject to an external load, yet insure that immediately upon application of a load such load will be equally and automatically distributed between all balls in contact with the screw. An example of a particularly advantageous application having need for these capabilities is the landing gear of an aircraft. In this application, as will be appreciated, it is of the greatest importance that the losses between relatively rotating parts be held to a minimum and yet that maximum advantage be taken of the strength of the structural material. It is therefore important that the extreme stresses imposed on the landing gear as the aircraft touches down on the landing strip be instantly and equally distributed between all load balls and all parts in contact therewith.

Referring to FIGURES 3 to 12, another preferred embodiment of the invention incorporating the features of the present invention will be described. Referring first to FIGURE 23, there is shown a ball bearing screw and nut mechanism in a typical operating environment having a screw 10' journalled in ball bearings 11' and driven through suitable gearing by an electric motor 12'. Mounted on screw 10' is a preloaded ball bearing nut mechanism designated generally 13' constructed in accordance with the present invention and connected through pivoted arm 14' to a device such as an airplane landing gear, not shown, which it is desired to shift linearly. The construction is such that rotation of screw 10' by motor 12' effects linear movement of nut mechanism 13' and of the device arranged to be driven through arms 14'.

Referring to FIGURE 24, nut mechanism 13' is shown as comprising a plurality of identical annular nuts or nut rings 16' mounted within a retaining sleeve 17' and held rigidly compressed against one another by adjustable end rings 18', the latter being threadedly inserted into the sleeve ends. Any number of nut rings 16', from one to a large number, may be employed, depending upon the design requirements of the particular screw and nut system.

Each nut or nut ring 16' is provided with an internal helical groove corresponding to the external groove on screw 10' and cooperating therewith to form the major or load loop of a race for a plurality of balls 20'. Balls 20' extend along at least one full turn or loop of the screw and nut grooves, the end portions of the single turn load groove preferably being overlapped slightly as shown to assure uniform distribution of the applied load throughout the entire circumference of the screw and of the nut rings. The overlapped ends of the load groove balls are positioned opposite a generally semi-cylindrical bore 21' formed in each nut ring and extending from face to face of the nut ring. Bore 21' serves to receive a ball return insert 22' (FIGURES 7 and 8) employed to transfer the balls 20' from one end of the load groove to the other end thereof and forming the small diameter ball return loop portion of the ball circuit. Insert 22' may be secured in nut ring 16' by any suitable means such as by welding, or by use of a pin 23' in the manner shown in FIGURE 5. This insert may be formed from metal or plastic by use of die casting, injection molding, powdered metal or other techniques.

According to the present invention, insert 22' is so constructed that balls 20' reverse direction two times in a smooth curve and form a small diameter return loop merging with the ends of the large diameter load groove loop thereby providing a complete ball race having a figure eight configuration as is best illustrated in FIGURE 12. More specifically, insert 22' is constructed with a generally semi-cylindrical body 25' corresponding in size to bore 21' and includes depending ears 26' and 27' formed one at each end portion of body 25' and on the opposite sides thereof. The ears 26' and 27' depend into screw groove 16 and screw 10' and serve as guides for the smooth and efficient transfer of balls 20' between the large diameter load grooves and the relatively small diameter ball return loop.

The loop-shaped passage through insert 22' comprises a groove 28' extending generally diagonally or obliquely to the longitudinal axis of insert body 25' as viewed in FIGURES 9 and 11, and terminates at the ends of ears 26' and 27'. Groove 28' opens outwardly along the outer side of the semi-cylindrical wall of insert body 25' so that balls 20' actually roll along the corresponding semi-cylindrical wall of bore 21' in nut ring 16', but is separate from the screw thread crest by a transverse bridge 29' (FIGURE 6), this bridge serving to complete the ball return loop and to maintain the balls out of contact with the crest of the screw thread. As is best illustrated in FIGURES 7 and 10, ears 26' and 27' are formed, respectively, with faces 31' and 32' which are so curved as to have the same radius and center as the wall of nut bore 21', so that these faces 31' and 32' are in perfect cylindrical or curvilinear continuity with the bore wall. In order to provide for this continuity the ears 26' and 27' are recessed back into the nut body, and protrude outwardly in opposite directions from insert body 25', as is best illustrated in FIGURE 9.

In the operation of the described illustrative embodiment of the invention shown in FIGURES 3 to 12, let it be assumed that the components of the ball bearing nut and screw mechanism 13' have been assembled to place these rings under compression axially of the mechanism with all of balls 20' actually in the large diameter load groove of each of the independent ball circuits under predetermined, uniformly distributed preload stress independently of external load conditions. Assuming now that screw 10' is rotated counterclockwise relative to nut rings 16' as viewed in FIGURES 5 and 7, the balls in the large diameter load groove formed by the mating grooves of the screw and the nut rings will roll counterclockwise relative to nut rings 16' until the balls engage faces 31' of ears 26'. The balls then roll upwardly along faces 31' in a smooth curve and onto the wall of bore or channel 21', these surfaces being in true curvilinear continuity due to the fact that face 31' lies on the interior surface of the same hypothetical cylinder, extending longitudinally of the screws, as the bore wall. Balls 20' then loop backwardly and outwardly through groove 28' between the overlapped ends of the large diameter single turn load groove loop or convolution. The balls are thus guided by the wall of channel 21', by the side walls of the insert body 25', and by the upper rounded wall of bridge 29' until they roll onto face 32' of ear 27' and thus back into the load groove.

It is to be noted that the balls in rolling upwardly on face 31' and into groove 28' reverse direction and are guided back over a screw thread crest in the small diameter ball return loop portion of the figure eight race, after which the balls again reverse direction and roll downwardly onto face 32' of ear 27' and back into the single turn load groove convolution between the screw and the nut ring. There is absolutely no break in the continuity of the walls over which the balls 20' are guided, and there are no sharp points or friction generators in the entire figure eight race. The balls thus move through the entire race in extremely frictionless manner so that the efficiency of the screw and nut mechanism is greatly increased as compared to former structures in which the balls do not roll in a figure eight but instead merely make a generally right angle turn over the screw thread crest. In circulating through the described closed loop circuits, it is pointed out that all balls within the main load groove of at least one full convolution of the screw are always maintained preloaded and elastically deformed by the preload forces with the result that each nut ring carries a full share of the applied load which share is distributed uniformly between all balls in the load groove.

While the particular preloaded ball bearing screw and nut mechanism herein shown and disclosed in detail is fully capable of attaining the objects and providing the advantages hereinbefore stated, it is to be understood that it is merely illustrative of the presently preferred embodiments of the invention and that no limitations are intended to the details of construction or design herein shown other than as defined in the appended claims.

I claim:

1. A ball bearing nut and screw mechanism comprising a screw having a helical ball seating groove extending therealong, a plurality of similar nut rings encircling said screw and having inwardly opening helical grooves substantially identical to said screw groove, each nut ring having a single full convolution load groove opening at its ends into ball return passage means formed in the body of the nut ring, said nut rings each being held assembled to said screw by independent closed circuits of recirculating balls, each of said circuits having a figure eight configuration, recess means extending crosswise of said rings and positioned to be in aligned registry with one another as said rings are held rotated against a fixed abutment adjacent said screw by a force sufficient to load the balls in contact with the screw by predetermined load values, and rigid close fitting key means extending through said aligned recesses to lock said nut rings precisely in the defined positions thereof to the end that an externally applied load will be distributed to all balls seated in said load convolutions.

2. A ball bearing nut and screw mechanism comprising a screw having a helical groove, a nut assembly encircling said screw and held assembled thereto by a plurality of independent continuous circuits of recirculating balls held captive between the helical groove of said screw and an associated complementary helical groove means formed along the inner side wall of said nut assembly, the latter groove means including ball return means for passing the balls of each ball circuit between the opposite ends of the portion of the circuit formed by the helical groove of said screw, said nut assembly including a plurality of nut sections rotated relative to one another axially of said screw to position the independent continuous circuit of recirculating balls in such manner as to load balls of each ball circuit against one side wall of the screw groove and along a path passing diagonally through the balls and substantially identically inclined to the longitudinal axis of the screw when the assembly is under load, and means for locking said nut sections rigidly locked against relative counter-rotation thereby providing a nut assembly having limited freedom of movement axially of said screw when there is no applied external load as well as one wherein the balls of the several independent ball circuits in contact with the helical groove of said screw are automatically placed under substantially equal loads simultaneously as an external load is applied to said mechanism.

3. A ball bearing nut and screw mechanism as defined in claim 2 characterized in that said means for locking said nut rings rigidly against relative counter-rotation comprises rigid means seated in snugly fitting keyway recesses extending crosswise of said nut rings and aligned with one another when the nut rings are precisely rotated to distribute an externally applied load uniformly to the balls associated with each of said nut rings.

4. A ball bearing nut and screw mechanism as defined in claim 3 characterized in the provision of shim means between adjacent nut rings, the thickness of the shim means employed being selected to permit and assure a desired uniformly distributed load on the balls in contact with said screw when keyway recesses of adjacent nut rings are in alignment and positioned to seat a common rigid means for locking said nut rings against relative rotary movement.

5. A ball bearing nut and screw mechanism wherein all balls in contact with the screw are adapted to share an externally applied load substantially uniformly and at the same time, said mechanism comprising a screw having a helical groove extending through a rigid unitary nut assembly composed of a plurality of like nut sections arranged side-by-side along said screw and locked together under predetermined axially acting load forces, each of said nut sections having its own independent circuit of recirculating balls including a ball return loop portion external to the screw groove and a load groove portion wherein most of the balls of a given circuit are in contact with the screw groove, means for locking the nut sections of said assembly against relative rotation with the load groove portions of their respective circuits under diagonal loading along lines all substantially identically inclined to the longitudinal axis of said mechanism, said interlocked nut sections and said screw having limited axial freedom of movement as a unitary assembly when no load is being applied to said ball bearing nut and screw mechanism.

References Cited by the Examiner

UNITED STATES PATENTS

| | | | |
|---|---|---|---|
| 2,659,241 | 11/53 | Holman | 74—424.8 |
| 2,749,812 | 6/56 | Wetzel | 74—441 |
| 2,756,609 | 7/56 | Hogan et al. | 74—459 |

FOREIGN PATENTS

| | | |
|---|---|---|
| 570,789 | 1/24 | France. |
| 725,181 | 9/42 | Germany. |
| 583,532 | 12/46 | Great Britain. |

BROUGHTON G. DURHAM, *Primary Examiner.*

FRANK H. BRONAUGH, DON A. WAITE, *Examiners.*

UNITED STATES PATENT OFFICE
CERTIFICATE OF CORRECTION

Patent No. 3,198,029                                            August 3, 1965

Harry Orner

It is hereby certified that error appears in the above numbered patent requiring correction and that the said Letters Patent should read as corrected below.

Column 6, line 18, after "rotated" insert -- in the same direction --.

Signed and sealed this 19th day of April 1966.

(SEAL)
Attest:

ERNEST W. SWIDER                                                EDWARD J. BRENNER
Attesting Officer                                                     Commissioner of Patents